US009344600B2

(12) United States Patent
Chen et al.

(10) Patent No.: US 9,344,600 B2
(45) Date of Patent: May 17, 2016

(54) ENCODING METHOD FOR GENERATING A DATA-BEARING HALFTONE IMAGE, AND DECODING METHOD FOR DECODING THE DATA-BEARING IMAGE

(71) Applicant: National Taipei University of Technology, Taipei (TW)

(72) Inventors: Yung-Yao Chen, Taipei (TW); Hsien-I Lin, Taipei (TW); Kai-Wen Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/730,918

(22) Filed: Jun. 4, 2015

(65) Prior Publication Data

US 2016/0088181 A1    Mar. 24, 2016

(30) Foreign Application Priority Data

Sep. 23, 2014 (TW) .............................. 103132780 A

(51) Int. Cl.

| | |
|---|---|
| H04N 1/32 | (2006.01) |
| H04N 1/405 | (2006.01) |
| G06K 15/00 | (2006.01) |
| G06K 19/06 | (2006.01) |
| G06T 1/00 | (2006.01) |
| G06K 15/02 | (2006.01) |
| B41M 3/10 | (2006.01) |
| B41M 3/14 | (2006.01) |
| B42D 25/305 | (2014.01) |
| B42D 25/333 | (2014.01) |

(52) U.S. Cl.
CPC ........ *H04N 1/32256* (2013.01); *G06K 15/1881* (2013.01); *G06K 15/1889* (2013.01); *G06K 15/4095* (2013.01); *G06K 19/06093* (2013.01); *G06T 1/0028* (2013.01); *H04N 1/32229* (2013.01); *H04N 1/405* (2013.01); *H04N 1/4051* (2013.01); *H04N 1/4055* (2013.01); *B41M 3/10* (2013.01); *B41M 3/14* (2013.01); *B42D 25/305* (2014.10); *B42D 25/333* (2014.10); *G06K 19/06178* (2013.01); *G06T 2201/0051* (2013.01); *G06T 2201/0064* (2013.01); *G06T 2201/0065* (2013.01); *H04N 2201/327* (2013.01); *H04N 2201/3271* (2013.01)

(58) Field of Classification Search
None
See application file for complete search history.

(56) References Cited

U.S. PATENT DOCUMENTS

| | | | | |
|---|---|---|---|---|
| 5,315,098 | A * | 5/1994 | Tow ....................... | G06K 1/121 235/469 |
| 6,331,898 | B1 * | 12/2001 | Yokoi ................... | G06K 1/121 358/1.9 |
| 8,170,274 | B2 * | 5/2012 | Au ........................ | G06T 1/0028 382/100 |
| 8,284,987 | B2 * | 10/2012 | Ulichney ........... | H04N 1/32256 382/100 |

(Continued)

*Primary Examiner* — Scott A Rogers
(74) *Attorney, Agent, or Firm* — The Mueller Law Office, P.C.

(57) ABSTRACT

An encoding system is for generating a data-bearing halftone image. The encoding system is configured to: convert a grayscale image into a halftone image having a plurality of image cells; select, from the halftone image, at least one of the image cells to be a carrier cell according to a set of reference dot patterns, the carrier cell having a dot pattern identical to one of the reference dot patterns; and generate a data-bearing halftone image by replacing the dot pattern of the carrier cell by a specified one of multiple encoding dot patterns of one of a plurality of the sets of encoding dot patterns each being associated with a code. The data-bearing halftone image is encoded with a code associated with the one of the sets of the encoding dot patterns.

4 Claims, 16 Drawing Sheets

(56) References Cited

U.S. PATENT DOCUMENTS

| | | | |
|---|---|---|---|
| 8,456,699 B2 * | 6/2013 | Ulichney | H04N 1/4055 358/1.9 |
| 8,634,110 B2 * | 1/2014 | Ulichney | H04N 1/4092 358/1.9 |
| 2015/0220823 A1 * | 8/2015 | Ulichney | H04N 1/405 358/3.06 |

* cited by examiner

| 125 | 120 | 122 | 125 | 100 | 105 | 137 | 185 | 64 | 75 | 87 | 80 | 13 | 12 | 11 | 10 |
|---|---|---|---|---|---|---|---|---|---|---|---|---|---|---|---|
| 124 | 124 | 128 | 130 | 103 | 0 | 9 | 180 | 53 | 94 | 93 | 92 | 15 | 10 | 12 | 9 |
| 128 | 124 | 122 | 121 | 105 | 6 | 12 | 154 | 70 | 90 | 95 | 77 | 17 | 11 | 12 | 8 |
| 117 | 117 | 120 | 119 | 100 | 97 | 85 | 87 | 62 | 81 | 80 | 75 | 12 | 12 | 10 | 13 |
| 0 | 5 | 4 | 7 | 0 | 5 | 0 | 0 | 0 | 5 | 0 | 1 | 100 | 103 | 107 | 99 |
| 5 | 3 | 0 | 2 | 7 | 5 | 245 | 247 | 7 | 254 | 250 | 0 | 97 | 95 | 94 | 99 |
| 9 | 10 | 4 | 0 | 5 | 1 | 122 | 240 | 3 | 255 | 250 | 8 | 99 | 90 | 92 | 103 |
| 247 | 240 | 245 | 249 | 253 | 249 | 250 | 255 | 10 | 15 | 0 | 3 | 103 | 120 | 110 | 109 |
| 147 | 157 | 150 | 160 | 255 | 238 | 255 | 247 | 57 | 50 | 3 | 240 | 10 | 13 | 12 | 10 |
| 15 | 0 | 5 | 5 | 249 | 14 | 15 | 245 | 50 | 7 | 12 | 244 | 17 | 255 | 252 | 12 |
| 6 | 13 | 12 | 9 | 250 | 15 | 13 | 251 | 9 | 50 | 33 | 254 | 10 | 255 | 250 | 9 |
| 0 | 4 | 2 | 7 | 254 | 244 | 234 | 250 | 122 | 109 | 54 | 250 | 10 | 11 | 13 | 12 |
| 5 | 4 | 2 | 0 | 254 | 255 | 247 | 249 | 90 | 107 | 92 | 100 | 0 | 0 | 0 | 0 |
| 7 | 2 | 1 | 0 | 7 | 5 | 0 | 2 | 99 | 92 | 95 | 100 | 0 | 92 | 95 | 0 |
| 5 | 0 | 4 | 0 | 5 | 1 | 12 | 10 | 90 | 95 | 99 | 102 | 90 | 99 | 92 | 11 |
| 0 | 0 | 0 | 0 | 207 | 205 | 199 | 204 | 109 | 107 | 105 | 106 | 2 | 3 | 1 | 12 |

ENCODING METHOD FOR GENERATING A DATA-BEARING HALFTONE IMAGE, AND DECODING METHOD FOR DECODING THE DATA-BEARING IMAGE

CROSS-REFERENCE TO RELATED APPLICATION

This application claims priority of Taiwanese Application No. 103132780, filed on Sep. 23, 2014.

FIELD

The disclosure relates to an encoding system and a decoding system, and more particularly to an encoding system and a decoding system that is capable of respectively generating a data-bearing halftone image, and decoding the data-bearing halftone image.

BACKGROUND

Barcode systems have been widely used in various aspects, such as automated logistic management, anti-counterfeit, labels, etc. In one application, a two-dimensional barcode or a QR code may be printed on a poster or digital contents for protecting copyrighted content from illicit and unauthorized use. However, the additional printed barcode or QR code may adversely affect the overall esthetics of the poster or digital contents.

Another anti-counterfeiting manner involves using steganography to conceal message (regarding the copyright) in the documents and images. For example, U.S. Pat. No. 8,594,453 discloses a conventional method for creating a data-bearing halftone image in the form of a stegatone (steganographic halftone).

As shown in FIG. 1, a cell of a grayscale image may be converted into a stegatone using one of the four stegatone cells 502, 504, 506 and 508. Each of the stegatone cells is associated with a binary code having two bits (e.g., '00', '01', '10' and '11'). As such, a message (e.g., a copyright claimer) in the form of a stream of binary codes may be represented by a series of stegatone cells which composes the data-bearing portion of the data-bearing halftone image, eliminating the need for a barcode.

However, an amount of data that is able to be contained in each of the stegatone cells 502, 504, 506 and 508 is limited to two bits. Specifically, in each of the stegatone cells, only four possible combinations of arrangements exist. Moreover, the arrangements of the grayscale image using the stegatone cells are deliberately made. As a result, the quality of the generated data-bearing halftone image may be compromised as well.

Other related documents regarding generation of a data-embedded halftone image includes:

Xu, Jianyun, et al., "JPEG Compression Immune Steganography Using Wavelet Transform," Proceedings of the International Conference on Information Technology: Coding and Computing, Las Vegas, Nev., Apl. 5-7, 2004, vol. 2, pp. 704-708;

Solanki, Kaushal, et al., "'Print and Scan' Resilient Data Hiding in Images," IEEE Transactions on Information Forensics and Security, vol. 1, No. 4, pp. 464-478, December 2006;

Ulichney, Robert, et al., "Encoding Information in Clustered-Dot Halftones," Presented at the 26th International Conference on Digital Printing Technologies, Sep. 19-23, 2010; and Chiew, Kang Leng, et al., "Identifying Steganographic Payload Location in Binary Image," PCM'10 Proceedings of the 11th Pacific Rim Conference on Advances in Multimedia Information Processing: Part I, Shanghai, China, Sep. 21-24, 2010, pp. 590-600, Published by Springer-Verlag, Berline, Heidelberg, 2010.

SUMMARY

Therefore, an object of the disclosure is to provide an encoding system that can alleviate at least one of the drawbacks of the prior arts.

According to the disclosure, the encoding system is for generating a data-bearing halftone image, and includes a halftoning module, a selecting module and an encoding module.

The halftoning module is configured to convert a grayscale image into a halftone image by screening the grayscale image using a predetermined clustered-dot threshold matrix. The predetermined clustered-dot threshold matrix includes a plurality of grayscale threshold values. The halftone image has a plurality of image cells each corresponding to the predetermined clustered-dot threshold matrix in size.

The selecting module is configured for selecting, from the halftone image, at least one of the image cells to be a carrier cell according to a set of reference dot patterns that corresponds with the predetermined clustered-dot threshold matrix. The carrier cell has a dot pattern identical to one of the reference dot patterns.

The encoding module stores a plurality of sets of encoding dot patterns. Each of the sets may be generated using one of clustered-dot ordered dithering and dispersed-dot ordered dithering, and is associated with a code.

The encoding module is configured to generate a data-bearing halftone image that is encoded with a code associated with one of the sets of the encoding dot patterns by replacing the dot pattern of the carrier cell by a specified one of the encoding dot patterns of the one of the sets of the encoding dot patterns.

Each of the dot pattern of the carrier cell, the reference dot patterns and the encoding dot patterns consists of a plurality of dots, at least one of which is a first-tone dot and each of the rest of which is a second-tone dot.

The specified one of the encoding dot patterns and the dot pattern of the carrier cell have the same number of the first-tone dot(s).

Another object of the disclosure is to provide a decoding system that is capable of decoding a data-bearing halftone image that is generated by the encoding system.

According to the disclosure, the decoding system is for decoding a data-bearing halftone image that is encoded with a code and that includes a plurality of image cells. The decoding system includes a database, a selecting module and a decoding module.

The database stores therein a grayscale image that corresponds to the data-bearing halftone image, a predetermined clustered-dot threshold matrix that includes a plurality of grayscale threshold values, a set of reference dot patterns that corresponds with the predetermined clustered-dot threshold matrix, and a plurality of sets of encoding dot patterns, each of the sets being associated with a code.

The selecting module is configured to:
convert the grayscale image into a halftone image by screening the grayscale image using the predetermined clustered-dot threshold matrix, the halftone image having a plurality of image cells each corresponding to the predetermined clustered-dot threshold matrix in size;
select, from the halftone image, at least one of the image cells to be a carrier cell according to the reference dot patterns, the carrier cell having a dot pattern identical to one of the reference dot patterns; and determine one of the image cells of the data-bearing halftone image that corresponds in position with the carrier cell as an encoded cell.

The decoding module is configured to decode the encoded cell of the data-bearing halftone image by:

identifying one of the sets of the encoding dot patterns that includes an encoding dot pattern identical to the dot pattern of the encoded cell; and determining the code represented by the encoded cell as the code associated with the identified one of the sets of the encoding dot patterns.

Still another of the disclosure is to provide a method to be implemented by the encoding system.

According to the disclosure, the method is for generating a data-bearing halftone image from a grayscale image. The method includes the steps of:

converting a grayscale image into a halftone image by screening the grayscale image using a predetermined clustered-dot threshold matrix that includes a plurality of grayscale threshold values, the halftone image having a plurality of image cells each corresponding to the predetermined clustered-dot threshold matrix in size;

selecting, from the halftone image, at least one of the image cells to be a carrier cell according to a set of reference dot patterns that corresponds with the predetermined clustered-dot threshold matrix, the carrier cell having a dot pattern identical to one of the reference dot patterns; and generating a data-bearing halftone image according to a plurality of sets of encoding dot patterns, each of the sets being associated with a code.

In the step of generating a data-bearing halftone image, the dot pattern of the carrier cell is replaced by a specified one of the encoding dot patterns of one of the sets of the encoding dot patterns, and the data-bearing halftone image thus generated is encoded with a code associated with said one of the sets of the encoding dot patterns.

Each of the dot pattern of the carrier cell, the reference dot patterns and the encoding dot patterns consists of a plurality of dots, at least one of which is a first-tone dot and each of the rest of which is a second-tone dot.

The specified one of the encoding dot patterns and the dot pattern of the carrier cell have the same number of the first-tone dot(s).

Yet another of the disclosure is to provide a method to be implemented by the decoding system.

According to the disclosure, the method is for decoding a data-bearing halftone image that is encoded with a code and that includes a plurality of image cells. The method includes the steps of:

converting a grayscale image that corresponds to the data-bearing halftone image into a halftone image by screening the grayscale image using a predetermined clustered-dot threshold matrix that includes a plurality of grayscale threshold values, the halftone image having a plurality of image cells each corresponding to the predetermined clustered-dot threshold matrix in size;

selecting, from the halftone image, at least one of the image cells to be a carrier cell according to a set of reference dot patterns that corresponds with the predetermined clustered-dot threshold matrix, the carrier cell having a dot pattern identical to one of the reference dot patterns;

determining one of the image cells of the data-bearing halftone image that corresponds in position with the carrier cell as an encoded cell; and decoding the encoded cell of the data-bearing halftone image according to a plurality of sets of encoding dot patterns, each of the sets being associated with a code.

In the step of decoding the encoded cell, one of the sets of the encoding dot patterns that includes an encoding dot pattern identical to the dot pattern of the encoded cell is identified, and the code represented by the encoded cell is determined as the code associated with the identified one of the sets of the encoding dot patterns.

BRIEF DESCRIPTION OF THE DRAWINGS

Other features and advantages of the disclosure will become apparent in the following detailed description of the embodiments with reference to the accompanying drawings, of which:

FIG. 12 illustrates the grayscale intensity value representation of the grayscale segment shown in FIG. 11;

FIG. 17 illustrates a data-bearing halftone image;

DETAILED DESCRIPTION

Figure 1:
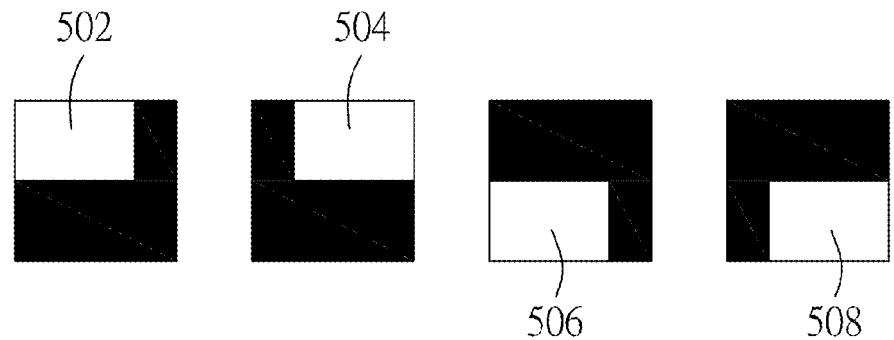
FIG. 1 illustrates a plurality of stegatone cells used in a conventional method for generating a data-bearing halftone image.
Figure 2:
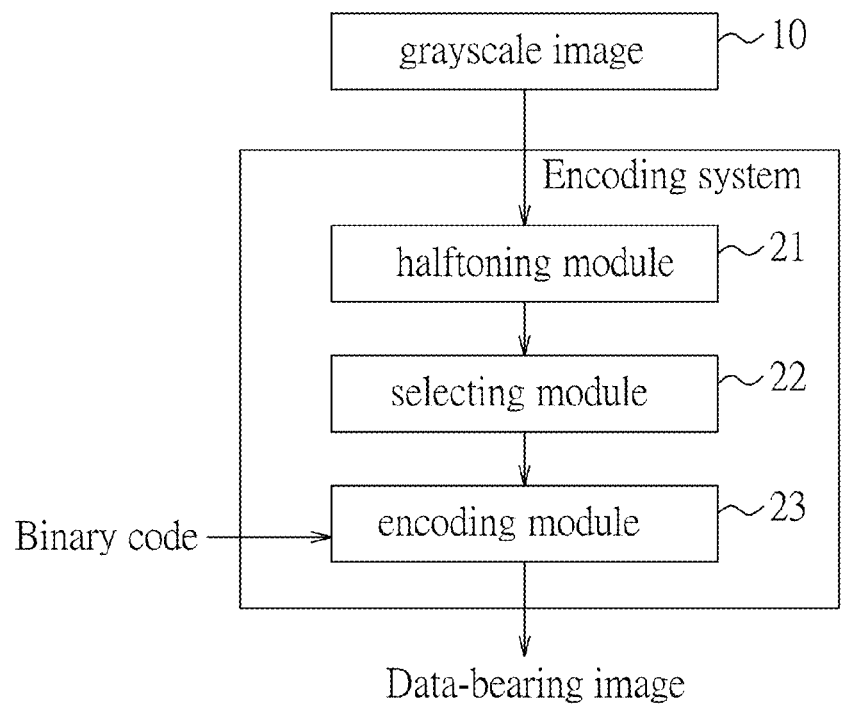
FIG. 2 is a block diagram illustrating an encoding system according to a first embodiment of the disclosure.

Referring to FIG. 2, the first embodiment of an encoding system is configured to generate a data-bearing halftone image from a grayscale image 10. In this embodiment, the grayscale image 10 has a size of 8*8 pixels, and is extracted from a full grayscale image (not depicted in the drawings) that is to be encoded.

The encoding system includes a halftoning module 21, a selecting module 22 and an encoding module 23.

Figure 3:
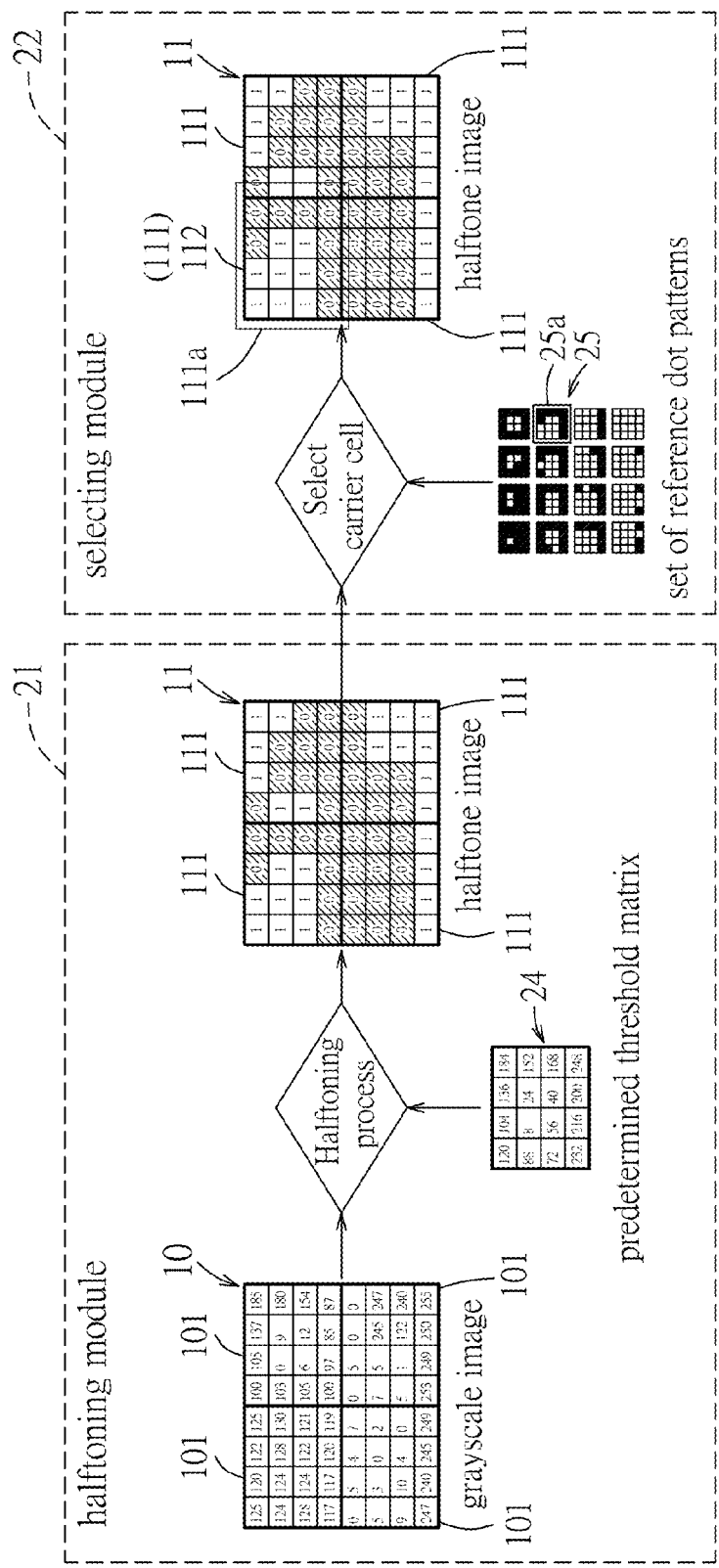
FIG. 3 illustrates operation of a halftoning module and a selection module of the encoding system according to the first embodiment.
Figure 4:
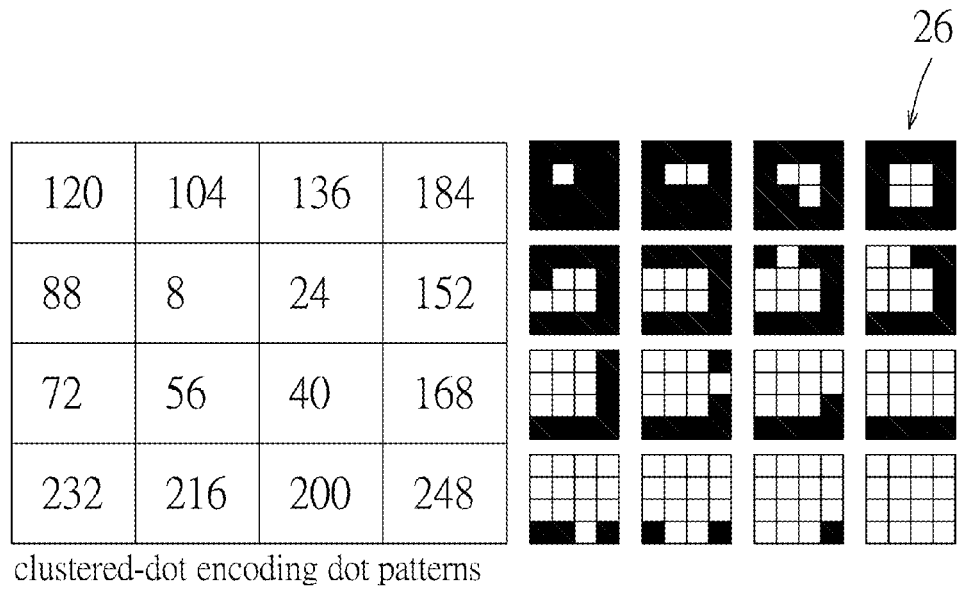
FIGS. 4 and 5 illustrate respectively two sets of clustered-dot encoding dot patterns created using clustered-dot threshold matrices for encoding a carrier cell.
Figure 5:
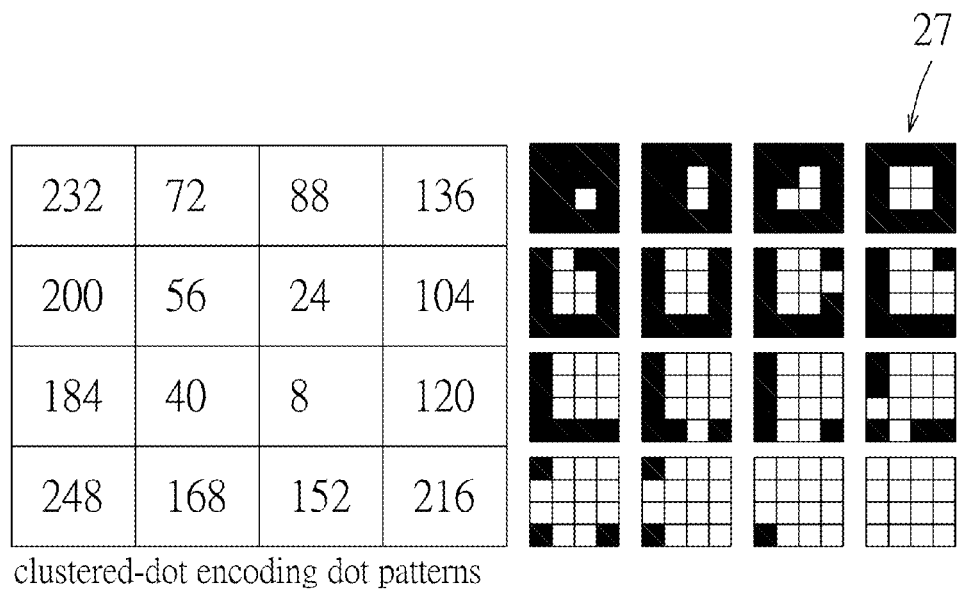
Figure 6:
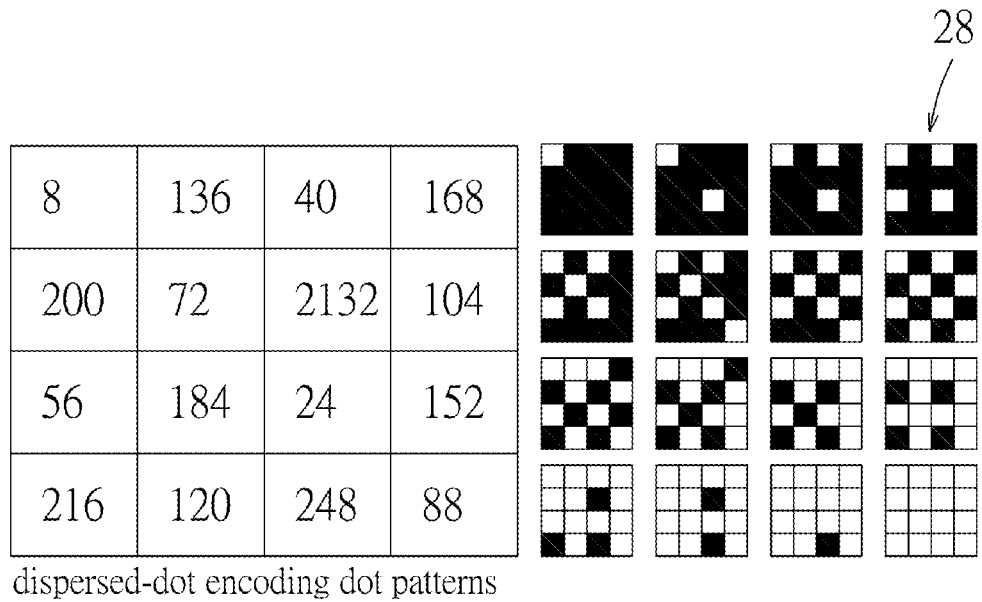
FIGS. 6 and 7 illustrate respectively two sets of dispersed-dot encoding dot patterns created using dispersed-dot threshold matrices for encoding a carrier cell.
Figure 7:
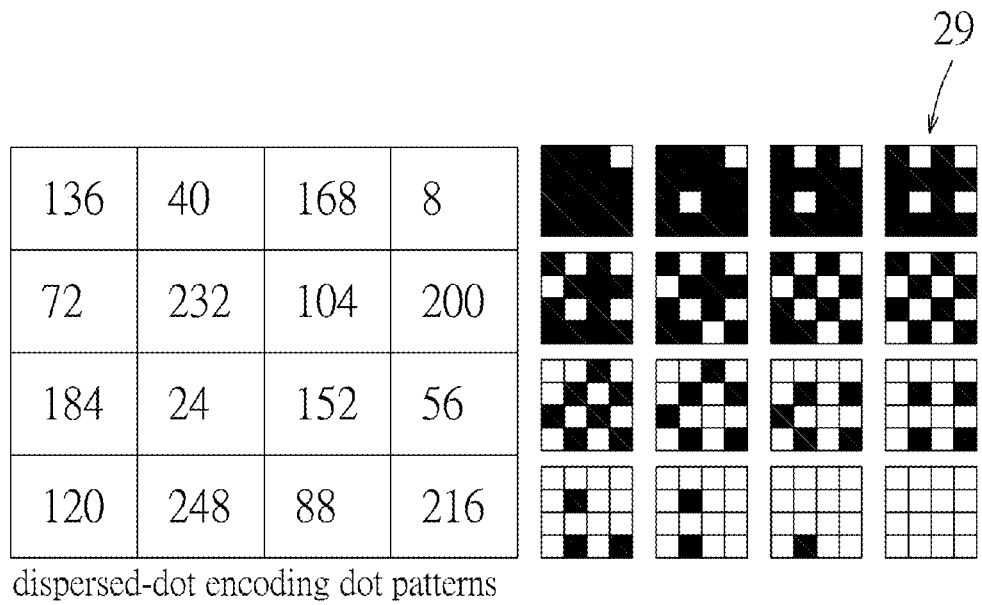

Referring to FIG. 3, the halftoning module 21 stores a predetermined threshold matrix 24, and is configured to convert the grayscale image 10 into a halftone image 11 by screening the grayscale image 10 using the predetermined threshold matrix 24. In this embodiment, the predetermined threshold matrix 24 is generated using clustered-dot technique, and will be referred to as the predetermined clustered-dot threshold matrix hereinafter. The process of converting the grayscale image 10 is also known in the art of the halftone technique.

Specifically, the predetermined clustered-dot threshold matrix 24 is generated using clustered-dot ordered dithering, has a size of 4*4 elements (each being referred to as a "grayscale threshold value"), and is generated with reference to a screen tile vector that consists of a pair of two-dimensional vectors.

The halftoning module 21 is configured to divide the grayscale image 10 into four grayscale image cells 101, each corresponding to the predetermined clustered-dot threshold matrix 24 in size. That is to say, the predetermined clustered-dot threshold matrix 24 includes a number (m) of threshold values, and each of the grayscale image cells 101 has the number (m) of pixels. In this embodiment, each of the grayscale image cells 101 has a size of 4*4 pixels, and each of the pixels is represented by a grayscale intensity value in the range of 0 to 255, where 0 indicates the strongest intensity and 255 indicates the lowest intensity.

In halftoning the grayscale image 10, each of the grayscale image cells 101 and the predetermined clustered-dot threshold matrix 24 are compared element by element (a process referred to as "screening"). When one element of the grayscale image cell 101 (i.e., the grayscale intensity value of the pixel) is greater than or equal to the corresponding element in the predetermined clustered-dot threshold matrix 24 (the grayscale threshold value) in value, a value '1' is outputted to represent a first-tone dot. Otherwise, a value '0' is outputted to represent a second-tone dot.

The outputted values from each of the grayscale image cells 101 compose a halftone image cell 111 of the halftone image 11, and the first-tone dot and second-tone dot represented by the outputted values compose a dot pattern of the image cell 111. The dot pattern of each of the image cells 111 of the halftone image 11 has the number (m) of dots (4*4 in this embodiment). In this embodiment, the first-tone dot represents a white dot, and the second-tone dot represents a black dot.

The selecting module 22 stores a set of reference dot patterns 25. In this embodiment, the set of reference dot patterns 25 corresponds with the predetermined clustered-dot threshold matrix 24. Specifically, the set of reference dot patterns 25 is derived from the predetermined clustered-dot threshold matrix 24 with reference to respective gray scales, using a screening process as described in the following.

In the screening process, a series of 4*4 screen matrices each having all elements assigned with grayscales within a predetermined range of the overall grayscales 0-255 are used sequentially for screening the predetermined clustered-dot threshold matrix 24.

For the screen matrix with all elements assigned with grayscales falling within the range of 0 to 7, all outputted values from the predetermined clustered-dot threshold matrix 24 are '0', and a resulting dot pattern consists entirely of the second-tone dots (black dots). This particular dot pattern will not be considered.

For the screen matrix with all elements assigned with grayscales falling within the range of 8 to 23, all but one outputted values from the predetermined clustered-dot threshold matrix 24 are '0', and a resulting dot pattern includes one first-tone dot, i.e., a white dot (corresponding in location with the element '8' of the predetermined clustered-dot threshold matrix 24). The screening process is iterated for other 14 screen matrices with the elements assigned grayscales within predetermined non-overlapping ranges of the grayscales (e.g., 24-39, 40-55, . . . , and 248-255), and up to 16 different dot patterns will be generated in the screening process, composing the set of reference dot patterns 25. Each of the reference dot patterns consists of a plurality of dots, at least one of which is the first-tone dot and each of the rest of which is the second-tone dot.

Additionally, the set of the reference dot patterns 25 includes a number (p) of the reference dot patterns, and an $i^{th}$ one of the reference dot patterns has a number (i) of the first-tone dots, where p is an integer smaller than or equal to m, and i is an integer ranging from 1 to p. In general, the last one in the set of reference dot patterns 25, which consists entirely of the first-tone dots (i.e., white dots) will be omitted since it cannot be used by the selecting module 22 as well become apparent from the following disclosure.

Afterward, the selecting module 22 is required to determine which part (s) of the halftone image 11 (i.e., which one(s) of the image cells 111) is available for embedding data therein. Such a part is hereinafter referred to as a "carrier cell".

In this embodiment, when one of the image cells 111 has a dot pattern identical to one of the reference dot patterns, the selecting module 22 determines the image cell 111 as a carrier cell 112. That is to say, the carrier cell 112 is used to be embedded with data therein.

Taking the halftone image 11 shown in FIG. 3 as an example, the image cell 111a has a dot pattern identical to that of the reference dot pattern 25a, thus making the image cell 111a the carrier cell 112.

Furthermore, the selecting module 22 may categorize a carrier cell as a low-frequency carrier cell if adjacent image cells thereof are all carrier cells, and categorizes the carrier cell a high-frequency carrier cell if otherwise.

Referring to FIGS. 4 to 7, the encoding module 23 (see FIG. 2) stores a number ($2^n$) sets of encoding dot patterns 26-29 with each set including the number (p) of the encoding dot patterns, and a $j^{th}$ one of the encoding dot patterns in each set having a number (j) of the first-tone dots (i.e., the white dots), where n is an integer greater than or equal to 1, and j is an integer ranging from 1 to p. It can be seen that in dot patterns in the sets are different from one another. Each of the encoding dot patterns consists of a plurality of dots, at least one of which is the first-tone dot and each of the rest of which is the second-tone dot.

In this embodiment, the encoding module 23 stores four sets of encoding dot patterns 26, 27, 28 and 29. Each of the sets 26 to 29 may be generated using one of clustered-dot ordered dithering and dispersed-dot ordered dithering. For example, in this embodiment, the sets 26 and 27 are generated using clustered-dot ordered dithering, and may be referred to as clustered-dot encoding dot patterns. On the other hand, the sets 28 and 29 are generated using dispersed-dot ordered dithering, and may be referred to as dispersed-dot encoding dot patterns.

Additionally, each of the clustered-dot encoding dot patterns 26 and 27 and each of the dispersed-dot encoding dot patterns 28 and 29 may be associated with a code. Particularly, each of the sets of the encoding dot patterns 26 to 29 is associated with a respective binary code with two bits (e.g., '00' for the set 26, '01' for the set 27, '10' for the set 28, and '11' for the set 29, respectively).

It is noted that, when a grayscale image is converted to a halftone image by a clustered-dot threshold matrix, the dots tend to cluster together; when a grayscale image is converted to a halftone image by a dispersed-dot threshold matrix, the dots tend to disperse.

Such a configuration allows the carrier cell 112 to be embedded with a two-bit binary code using one of the sets of the encoding dot patterns 26 to 29.

Figure 8:
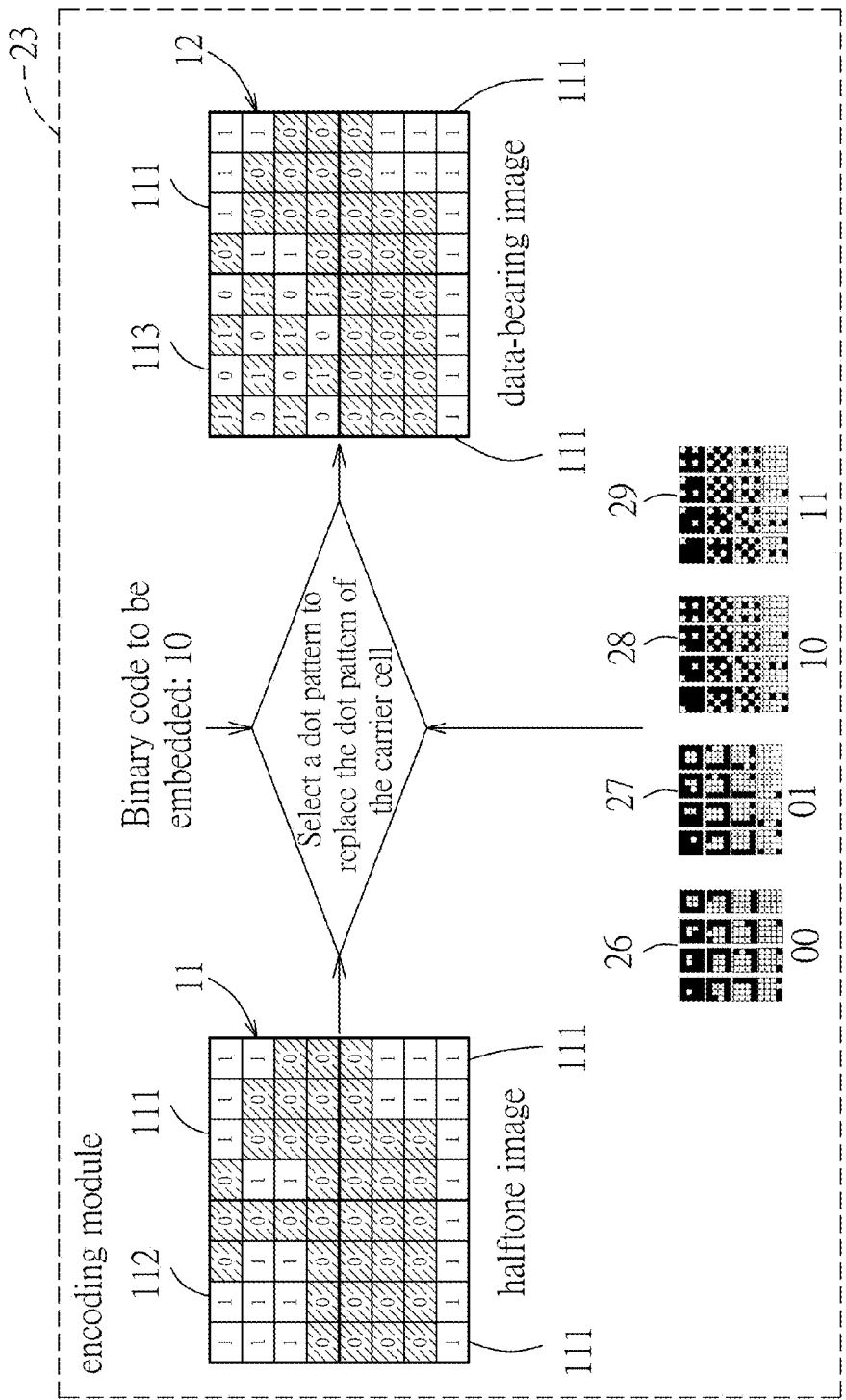
FIG. 8 illustrates operation of an encoding module of the encoding system according to the first embodiment.

Taking the halftone image 11 shown in FIG. 8 as an example, when it is intended to embed the binary code '10' into the carrier cell 112, the encoding module 23 is configured to determine the number of the white dots contained in the carrier cell 112 (eight white dots is contained in this example). Then, the encoding module 23 is configured to look up one of the sets of the encoding dot patterns (the set 28), which is associated with the binary code '10' to be embedded, and to locate in the set 28 a specified one of the encoding dot patterns that has exactly eight white dots. Afterward, the encoding module 23 is configured to replace the dot pattern of the carrier cell 112 by the specified one of the encoding dot patterns of the one of the sets of the reference dot patterns (i.e., the one with eight white dots in the set 28), thereby outputting a data-bearing halftone image 12 with an encoded cell 113.

One advantage of this embodiment is that, the generation of the encoded cell 113 involves replacing the dot pattern of the carrier cell 112 by a specified encoding dot pattern having the same number of the white dots. As a result, the quality of the data-bearing halftone image 12 will not be affected by the above operation.

Additionally, for embedding binary codes with a number (n) of bits, a number ($2^n$) of the sets of the encoding dot patterns may be employed. For example, when it is intended to embed 3 bits of binary codes into a carrier cell 112, eight of the sets of the encoding dot patterns may be employed (the eight sets of the encoding dot patterns may include a number ($2^i$) of the sets of the encoding dot patterns, where i=3). Various numbers of sets of the encoding dot patterns may be employed for accommodating other forms of data. Moreover, in a case that there is not enough carrier cells in the halftone image 11 for embedding a string of binary codes, another grayscale image may be extracted from the full grayscale image, and the above procedure is repeated until the string of binary codes is completely embedded.

Figure 9:
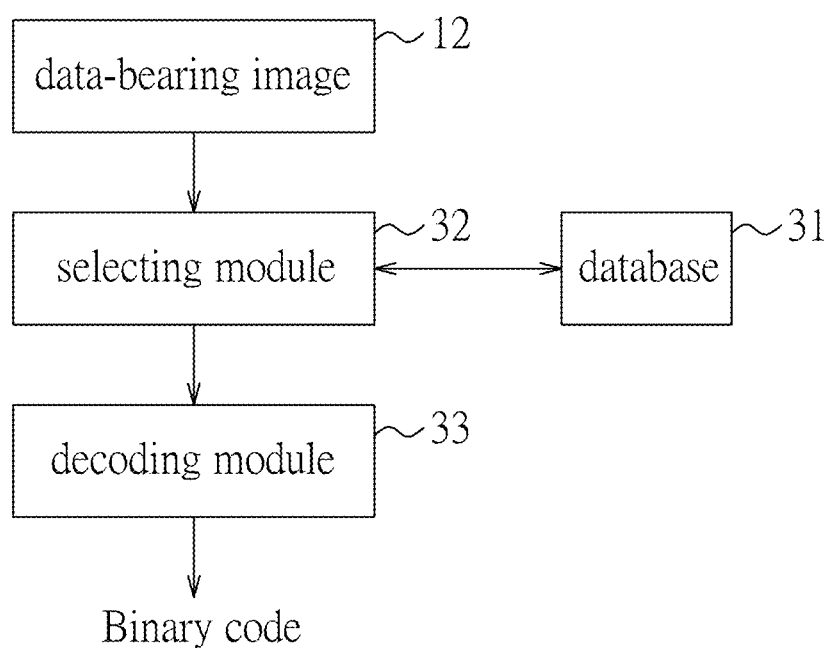
FIG. 9 is a block diagram illustrating a decoding system according to the first embodiment.

FIG. 9 illustrates a decoding system for decoding the data-bearing halftone image 12 generated by the encoding system of FIG. 2. The decoding system includes a database 31, a selecting module 32 and a decoding module 33.

Figure 10:
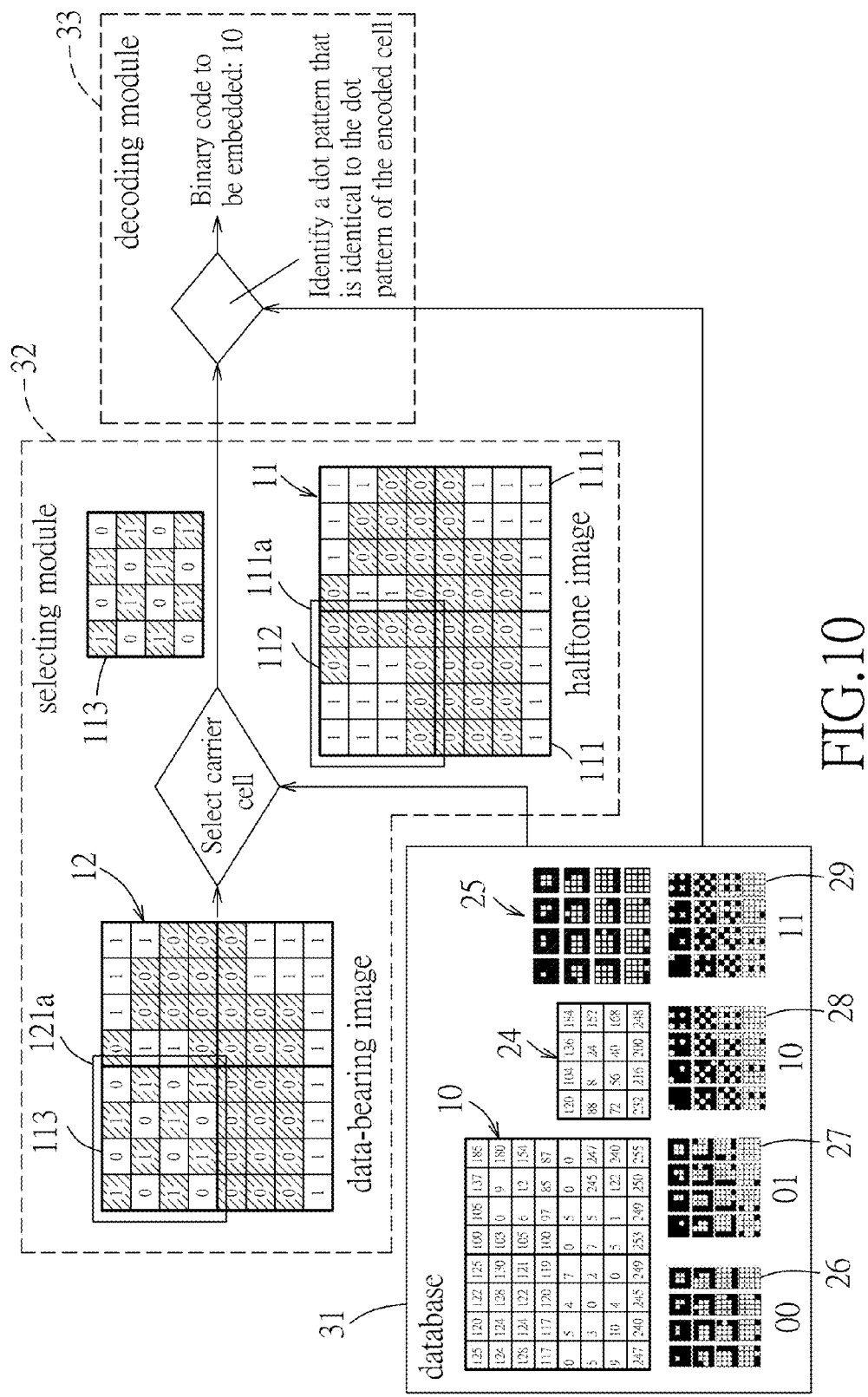
FIG. 10 illustrates operation of the decoding system according to the first embodiment.

With further reference to FIG. 10, the database stores the grayscale image 10 that is used for generating the data-bearing halftone image 12, the predetermined clustered-dot threshold matrix 24, the set of reference dot patterns 25, and the sets of encoding dot patterns 26 to 29.

As shown in FIG. 10, a part of the data-bearing halftone image 12 is taken for decoding. In a decoding process, the selecting module 32 first converts the grayscale image 10 stored in the database 31 into the halftone image 11 with reference to the predetermined clustered-dot threshold matrix 24, in a manner similar to that of the halftoning module 21. The generated halftone image 11 also includes a plurality of image cells 111 each corresponding to the predetermined clustered-dot threshold matrix 24 in size.

In other embodiments, should the database 31 store therein multiple grayscale images, an input may be provided to indicate which grayscale image is to be converted into the halftone image upon receipt of the data-bearing halftone image 12 for performing subsequent decoding of the data-bearing halftone image 12.

Afterward, in order to determine which part of the data-bearing halftone image 12 is the encoded cell 113, the selecting module 32 is configured to select, from the halftone image 11, at least one of the image cells 111 to be a carrier cell 112 according to the set of reference dot patterns 25. Similarly, an image cell 111 having a dot pattern identical to one of the reference dot patterns is selected as a carrier cell 112.

It is assumed that, since the selecting module 22 of the encoding system is configured to select the carrier cell 112 using a criterion identical to that of the selecting module 32 of the decoding system, and the carrier cell 112 thus selected is encoded and become s the encoded cell 113, the location of the encoded cell 113 may be determined by locating the carrier cell 112 in the halftone image 11 shown in FIG. 10.

As shown in FIG. 10, the selecting module 32 selects the image cell 111a the halftone image 11 as the carrier cell 112. Accordingly, the image cell 121a in the data-bearing halftone image 12, which corresponds to the carrier cell 112 in position, is determined as the encoded cell 113, in which a binary code is embedded.

With the encoded cell 113 being located, the decoding module 33 is configured to first determine a number of white dots contained in the encoded cell 113 (eight white dots is contained in this example). Then, for each of the plurality of sets of encoding dot patterns 26 to 29, the decoding module 33 examines a specified one of the encoding dot patterns with exactly eight white dots. When one of the encoding dot patterns under examination is determined to be identical to the dot pattern of the encoded cell 113, one of the sets of encoding dot patterns 26 to 29 to which the one of the encoding dot patterns belongs to (i.e., the set 28) can be identified.

Afterward, the decoding module 33 determines the binary code represented by the encoded cell 113 as the binary code '10' associated with the identified one of the sets of the encoding dot patterns (i.e., the set 28).

For the other potential encoded cells in the data-bearing halftone image 12, the above decoding process is repeated for outputting the data embedded therein.

Figure 11:
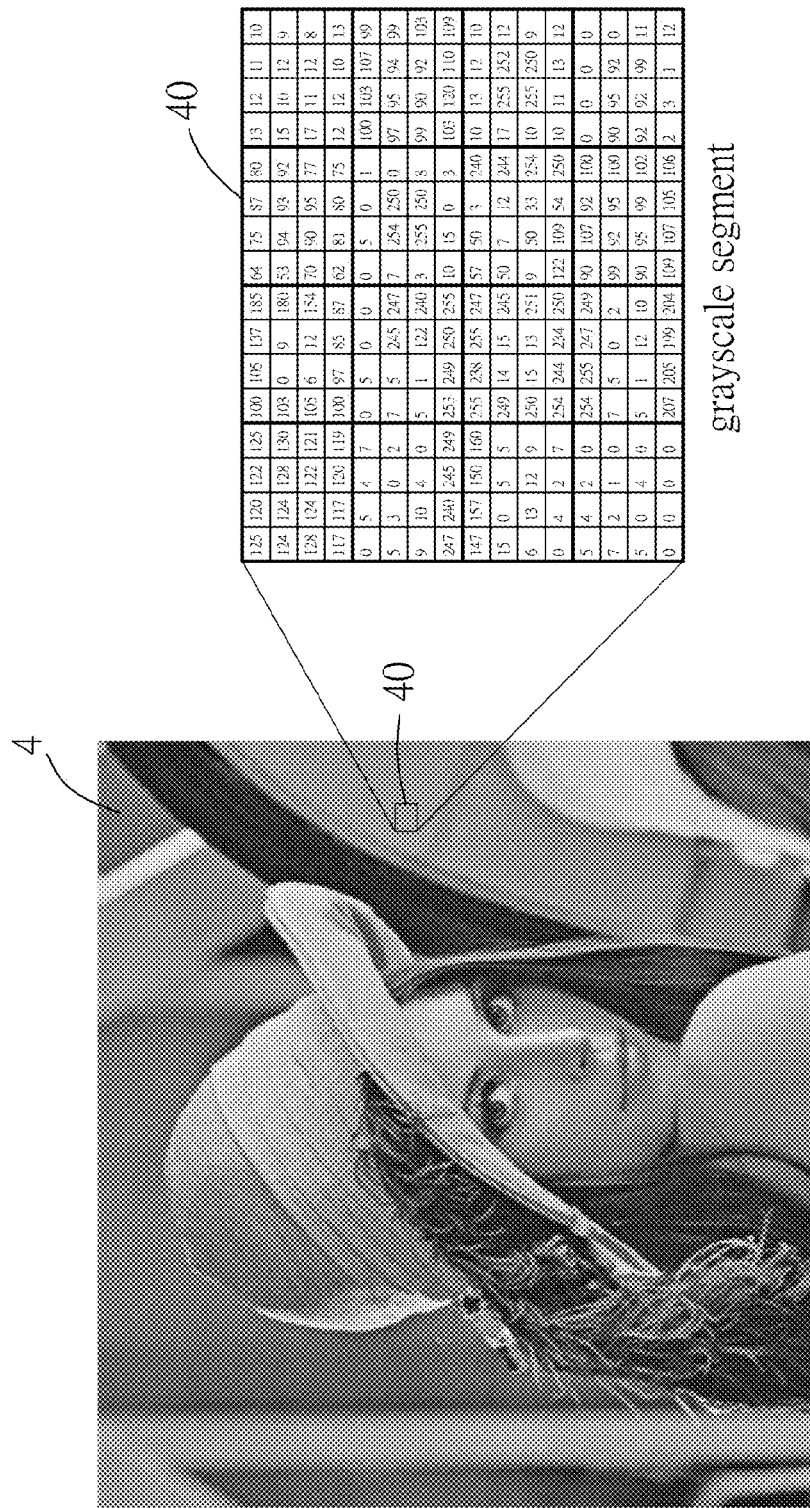
FIG. 11 illustrates a grayscale image and a grayscale intensity value representation of a grayscale segment of the grayscale image.

According to a second embodiment of the disclosure, an encoding system is for encoding a grayscale image (see FIG. 11). In this embodiment, a grayscale segment 40 of the full grayscale image 4 with a size of 16*16 pixels is taken to be encoded. The grayscale segment 40 may be presented in the form of a series of grayscale intensity values, as shown in FIG. 12.

Figure 13:
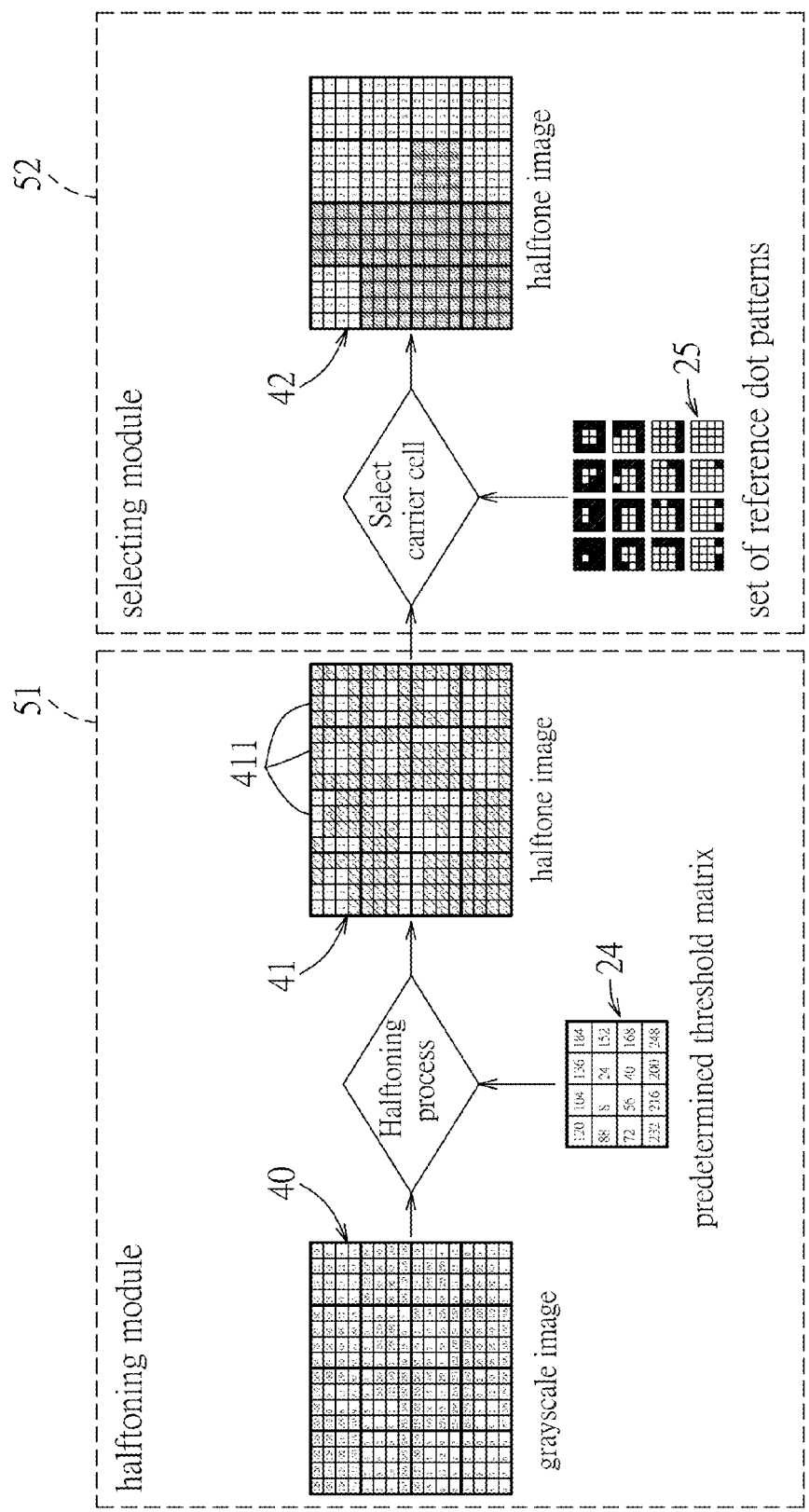
FIG. 13 illustrates operation of a halftoning module and a selection module of an encoding system according to a second embodiment of the disclosure.
Figure 16:
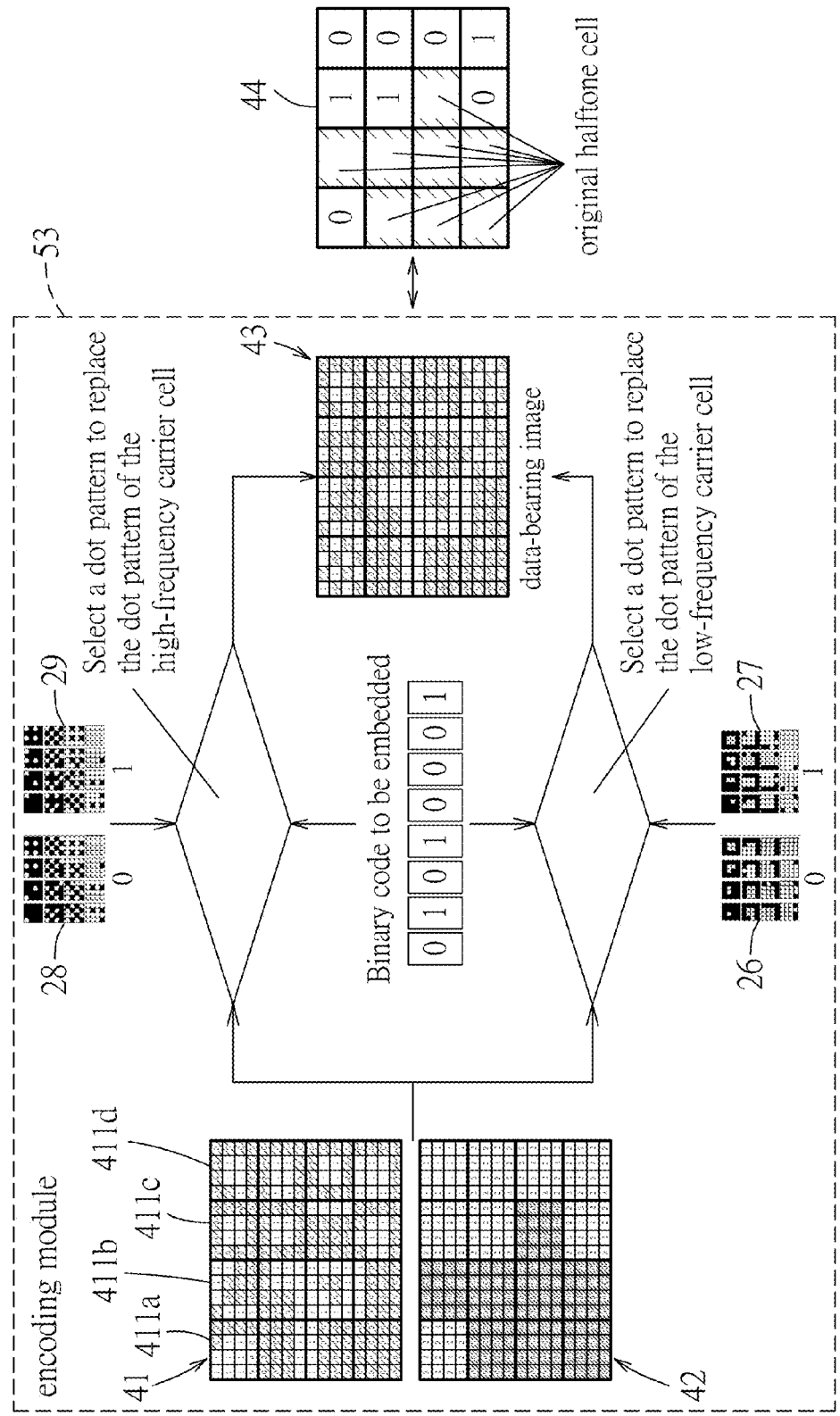
FIG. 16 illustrates operation of an encoding module of the encoding system according to the second embodiment.

As shown in FIGS. 13 and 16, the encoding system includes a halftoning module 51, a selecting module 52 and an encoding module 53.

The halftoning module 51 is configured to convert the grayscale segment 40 into a halftone image 41 by screening the grayscale segment 40 using the predetermined clustered-dot threshold matrix 24 as described in the first embodiment. That is, the predetermined clustered-dot threshold matrix 24 has a size of 4*4, and includes 16 grayscale threshold values. The halftone image 41 has a plurality of image cells 411 each corresponding to the predetermined clustered-dot threshold matrix 24 in size (i.e, 4*4 pixels).

Figure 14:
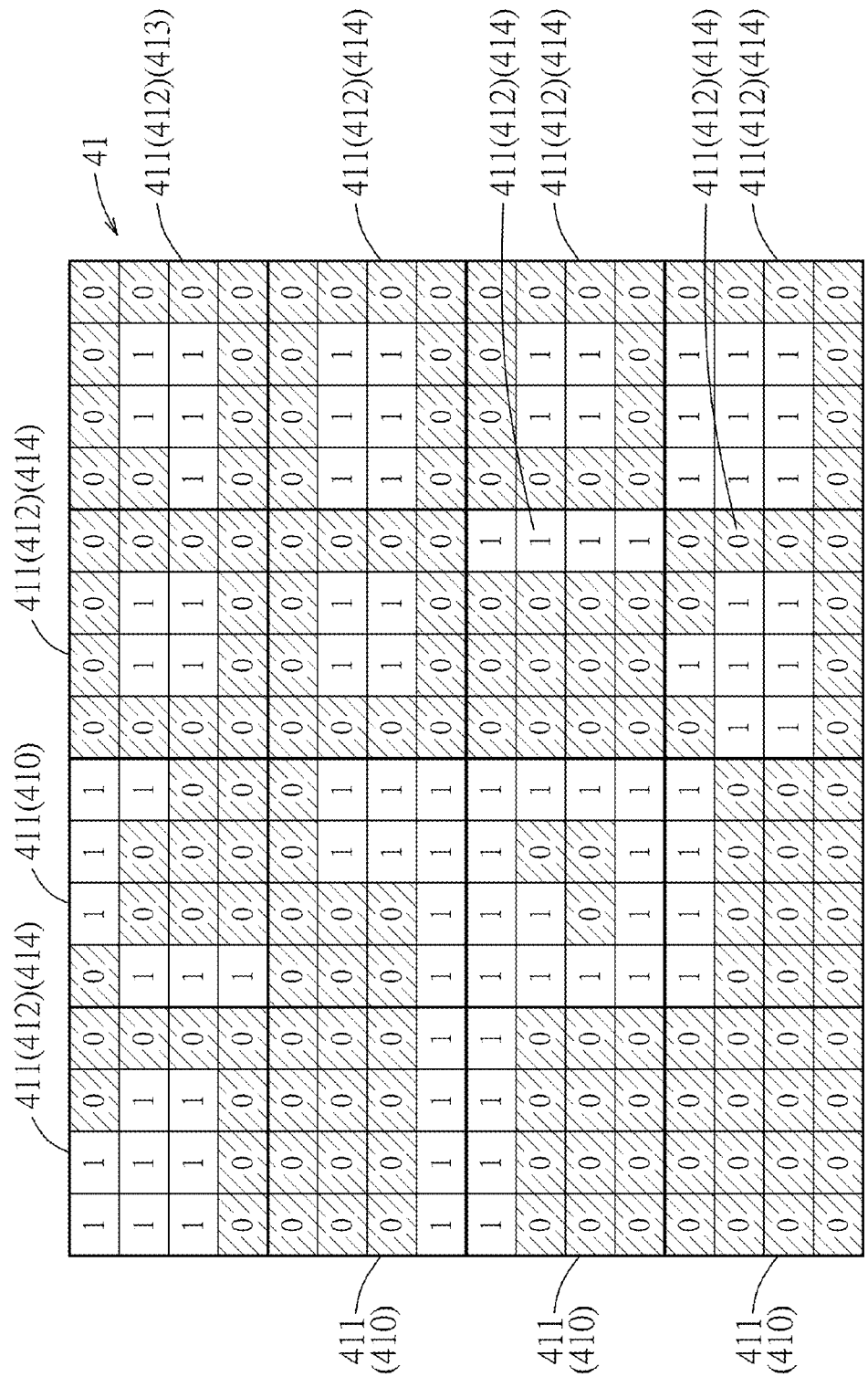
FIG. 14 illustrates a halftone image generated by the encoding system according to the second embodiment.

In this embodiment, the selecting module 52 categorizes each of the image cells 411 in the halftone image 41 as one of a non-carrier cell 410, which has the dot pattern not identical to anyone of the reference dot patterns, and a carrier cell 412, which has the dot pattern identical to any one of the reference dot patterns (see FIG. 14).

Furthermore, the selecting module 52 categorizes each carrier cell 412 as a low-frequency carrier cell 413 (see FIG. 14) if adjacent image cells 11 thereof are all carrier cells 412, and categorizes the carrier cell 412 a high-frequency carrier cell 414 (see FIG. 14) if otherwise. For example, in FIG. 14, the upper-right one of the image cells 411 is categorized as a carrier cell 412, and is further categorized as a low-frequency carrier cell 413 since all of its adjacent image cells 11 are also carrier cells 412. The rest of the carrier cells 412 except the low-frequency carrier cell 413 are categorized as high-frequency carrier cells 414.

Figure 15:
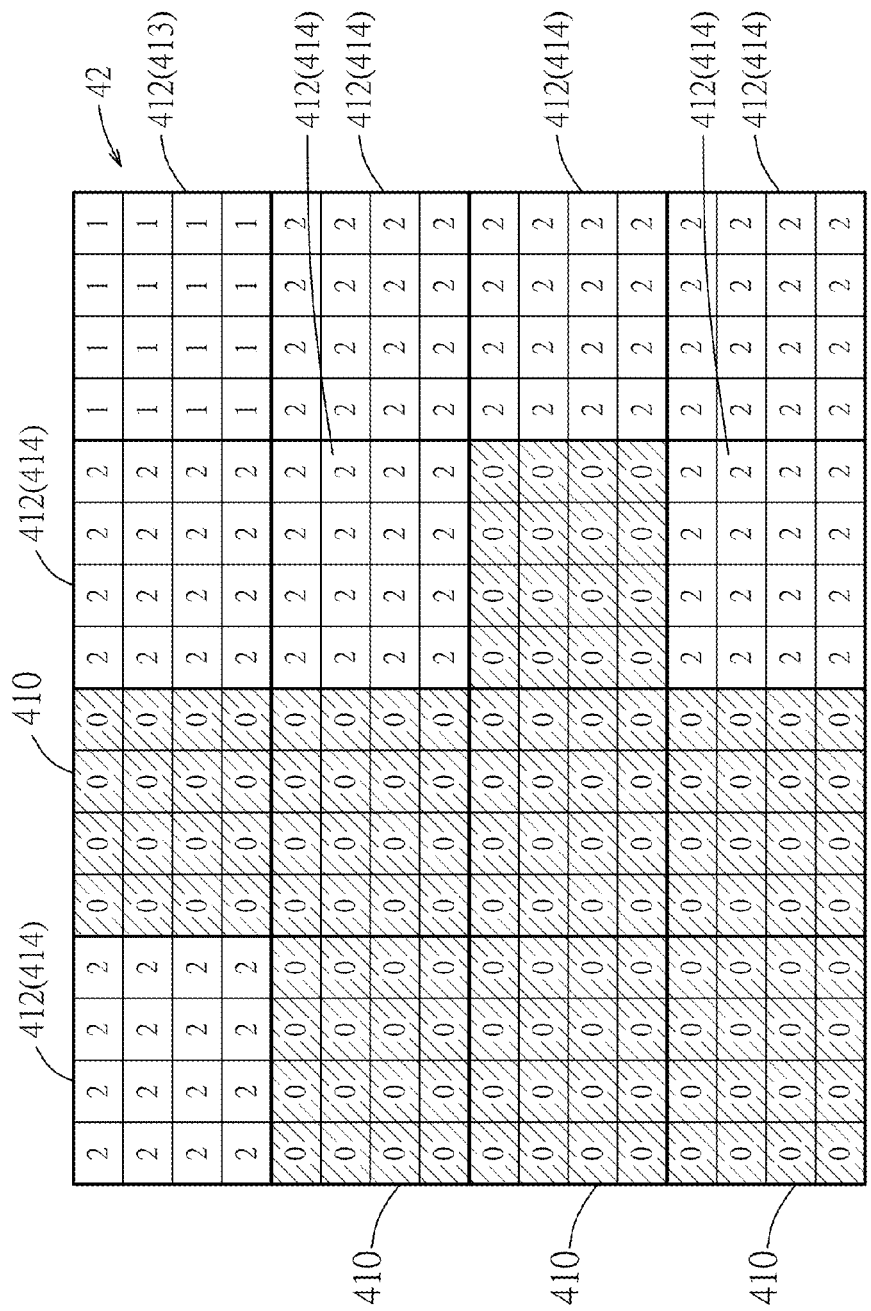
FIG. 15 illustrates a carrier cell map corresponding with the halftone image shown in FIG. 14.

The selecting module 52 is capable of indicating locations of the low-frequency carrier cell 413 and high-frequency carrier cells 414 in the halftone image 41 using a carrier cell map 42 as best shown in FIG. 15. In the carrier cell map 42, pixels of the low-frequency carrier cells 413 may be labeled using a first label (e.g., a number '1'), pixels of the high-frequency carrier cells 414 may be labeled using a second label (e.g., a number '2'), and pixels of the non-carrier cells 410 may be labeled using a third label (e.g., a number '0'). The selecting module 52 determines a part of the data-bearing halftone image 43 that corresponds in position with the low-frequency carrier cell as a low-frequency encoded cell, and apart of the data-bearing halftone image 43 that corresponds in position with the high-frequency carrier cell as a high-frequency encoded cell.

In this embodiment, the encoding module 53 stores four sets of the clustered-dot encoding dot patterns 26 to 29. Specifically, two of the sets of the encoding dot patterns 26 and 27 are generated using clustered-dot ordered dithering and indicate respectively two different symbols of a binary numeral system (i.e., bit '0' and bit '1', respectively).

Another two of the sets of the dispersed-dot encoding dot patterns 28 and 29 are generated using dispersed-dot ordered dithering and indicate respectively the two different symbols of the binary numeral system.

In this embodiment, the encoding module 53 is configured to generate a data-bearing halftone image 44 embedded with a binary code. Specifically, for the low-frequency carrier cell 413, the encoding module 53 replaces the dot pattern of the low-frequency carrier cell 413 in the halftone image 41 by one of the encoding dot patterns that has a number of first-tone dots same as a number of first-tone dots in the dot pattern of the low-frequency carrier cell 413, and that is included in one of the sets 26 and 27, which is generated using the clustered-dot ordered dithering and which indicates one of the symbols for composing the binary code.

On the other hand, for the high-frequency carrier cells 414, the encoding module 53 replaces the dot pattern of each of the high-frequency carrier cells 414 in the halftone image 41 by one of the encoding dot patterns that has a number of first-tone dots same as a number of first-tone dots in the dot pattern of the high-frequency carrier cell 414, and that is included in one of the sets 28 and 29, which is generated using the dispersed-dot ordered dithering and which indicates one of the symbols for composing the binary code.

An advantage of this embodiment is that, it is known in the art that when a digital image is outputted by a printing device (e.g., a laser printer, an electrophotographic device, an offset printing machine, etc.), the dispersedly arranged black pixels may not be accurately printed onto the printing surface. Therefore, for encoding the low-frequency carrier cells 414, the encoding dot patterns generated using clustered-dot ordered dithering can be adopted to alleviate the aforementioned adverse effect. For encoding the high-frequency carrier cells 413, the encoding dot patterns generated using dispersed-dot ordered dithering may be adopted to optimize the quality of the data-bearing halftone image 44 printed by the printing device. Specifically, a detail rendition capability of the data-bearing halftone image 44 can be improved.

For an example as shown in FIG. 16, a binary string '01010001' is intended to be embedded into the halftone image 41. In this embodiment, the encoding module 53 sequentially performs the encoding process on the carrier cells 412 from left to right and from top to bottom.

Specifically, the first bit of the binary string ('0') will be embedded in the image cell 411$a$. According to the carrier cell map 42, the image cell 411$a$ is categorized as a high-frequency carrier cell 414. As a result, one of the dot patterns included in the set of encoding dot patterns 28 will be employed for the encoding. The dot pattern of the image cell 411$a$ includes eight white dots; therefore, the encoding module 53 replaces the dot pattern of the image cell 411$a$ by one of the encoding dot patterns in the set 28 that includes exactly eight white dots, creating an encoded cell.

Then, the encoding module 53 ignores the image cell 411$b$, which is categorized as a non-carrier cell 410, in the encoding.

For the next image cell 411$c$ which has a dot pattern including four white dots and which is also categorized as a high-frequency carrier cell 414, it is, for example, intended to embed the second bit of the binary string ('1') therein. To do so, the encoding module 53 replaces the dot pattern of the image cell 411$c$ by one of the encoding dot patterns in the set 29 that includes exactly four white dots.

For the next image cell 411$d$, which has a dot pattern including five white dots and which is categorized as a low-frequency carrier cell 413, it is intended to embed the third bit of the binary string ('0') therein. To do so, the encoding module 53 replaces the dot pattern of the image cell 411$d$ by one of the encoding dot patterns in the set 26 that includes exactly five white dots.

The above mentioned encoding process is repeated for other carrier cells 412 in the halftone image 41 in order to generate a data-bearing halftone image 44 that is embedded with the binary code "01010001". Using such a process ensured that the encoding dot patterns used to replace the high-frequency carrier cell (s) 414 are generated using the dispersed-dot ordered dithering, that is, the first-tone (white) dots are dispersed in the encoding dot patterns. On the other hand, the encoding dot patterns used to replace the low-frequency carrier cell (s) 413 are generated using the clustered-dot ordered dithering, that is, the first-tone (white) dots are clustered in the encoding dot patterns. As a result, the data-bearing halftone image 44 may be outputted by a printing device without risking the isolated pixels being left out.

Figure 17:
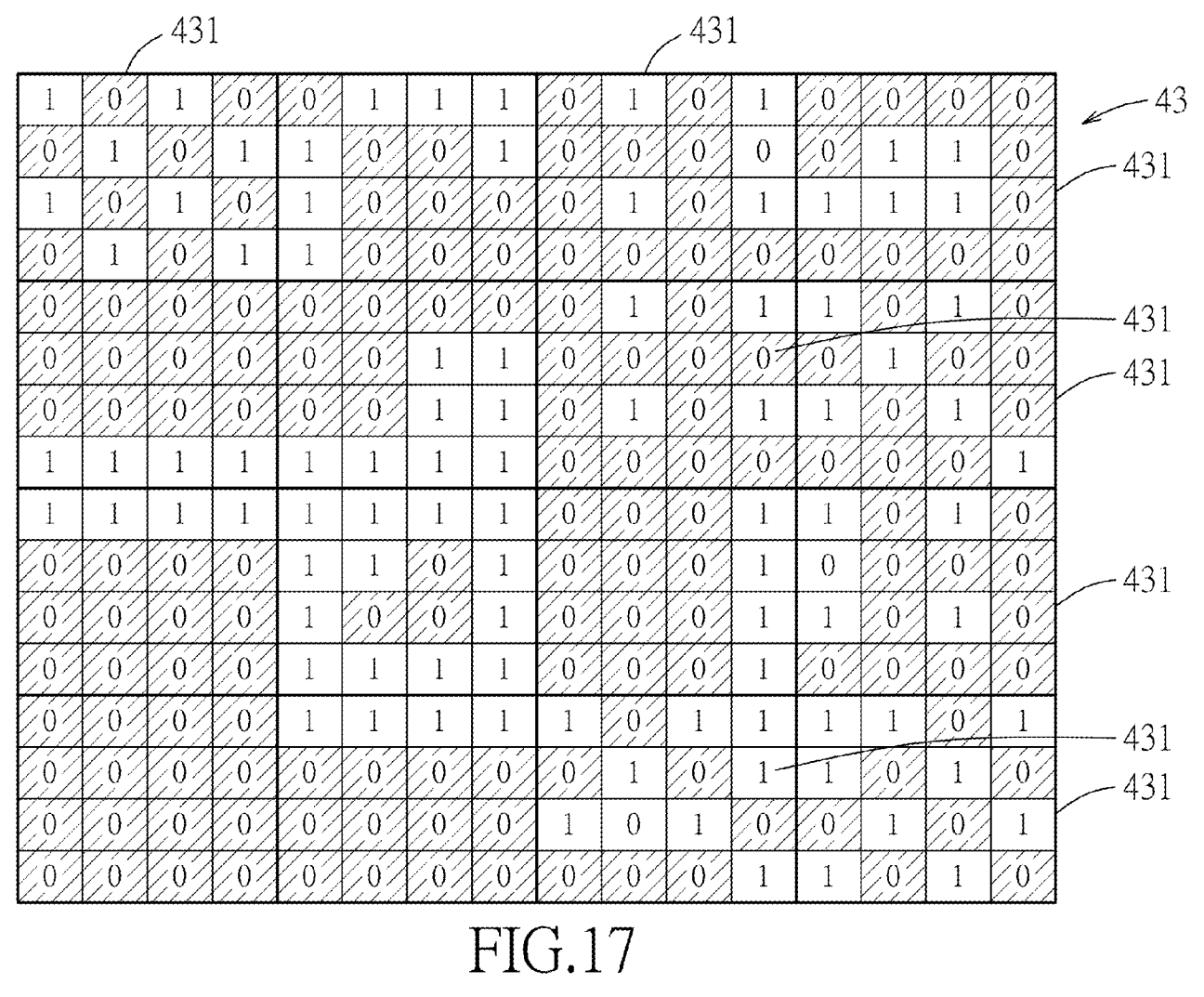
Figure 18:
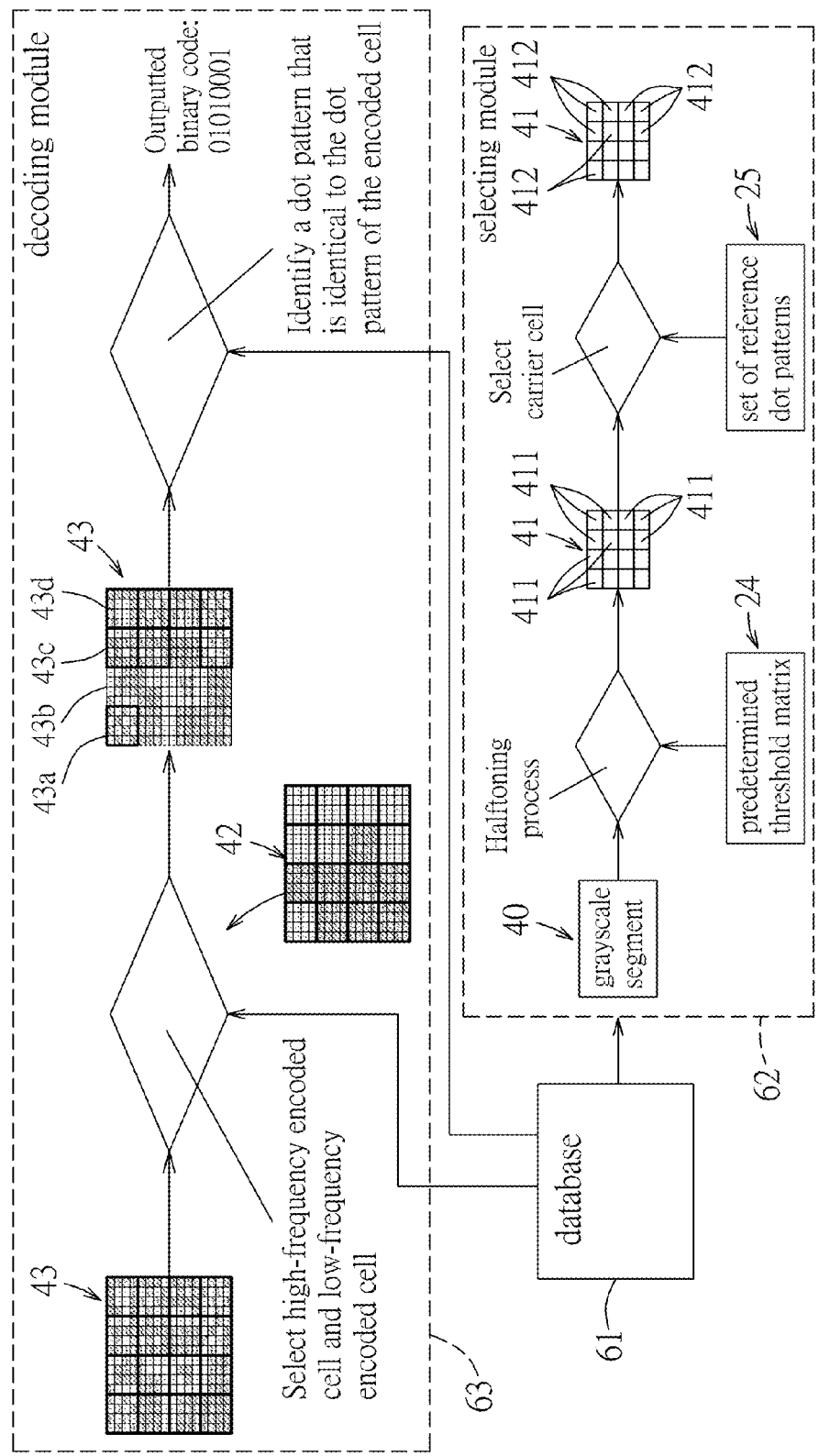
FIG. 18 illustrates operation of a decoding system according to the second embodiment.

FIG. 18 illustrates a decoding system for decoding a data-bearing halftone image 43 (see FIG. 17), according to the second embodiment of the disclosure. The decoding system includes a database 61, a selecting module 62 and a decoding module 63.

The database 61 stores therein the grayscale image 4 (see FIG. 11) used for generating the data-bearing halftone image 43, the predetermined clustered-dot threshold matrix 24, the set of reference dot patterns 25, and the sets of the encoding dot patterns 26 to 29 (see FIGS. 4 to 7).

Further referring to FIG. 17, a part of the data-bearing halftone image 43 is taken for decoding. In a decoding process, the selecting module 62 first converts the grayscale image 4 stored in the database 61 into the halftone image 41 with reference to the predetermined clustered-dot threshold matrix 24, in a manner similar to that of the halftoning module 51. The generated halftone image 41 also includes a plurality of image cells 411 each corresponding to the predetermined clustered-dot threshold matrix 24 in size.

In other embodiments, should the database 61 store therein multiple grayscale images, an input may be provided to indicate which grayscale image is to be converted into the halftone image upon receipt of the data-bearing halftone image 43 for performing subsequent decoding of the data-bearing halftone image 43. Afterward, in order to determine which part of the data-bearing halftone image 43 is the encoded cell, the selecting module 62 is configured to select, from the halftone image 41, at least one of the image cells 411 to be a carrier cell 412 according to the set of reference dot patterns 25. Similarly, an image cell 411 having a dot pattern identical to one of the reference dot patterns is selected as a carrier cell 412.

Furthermore, the selecting module 62 categorizes the carrier cell 412 as one of the low-frequency carrier cell 413 (see FIG. 14) and the high-frequency carrier cell 414 (see FIG. 14).

Figure 19:
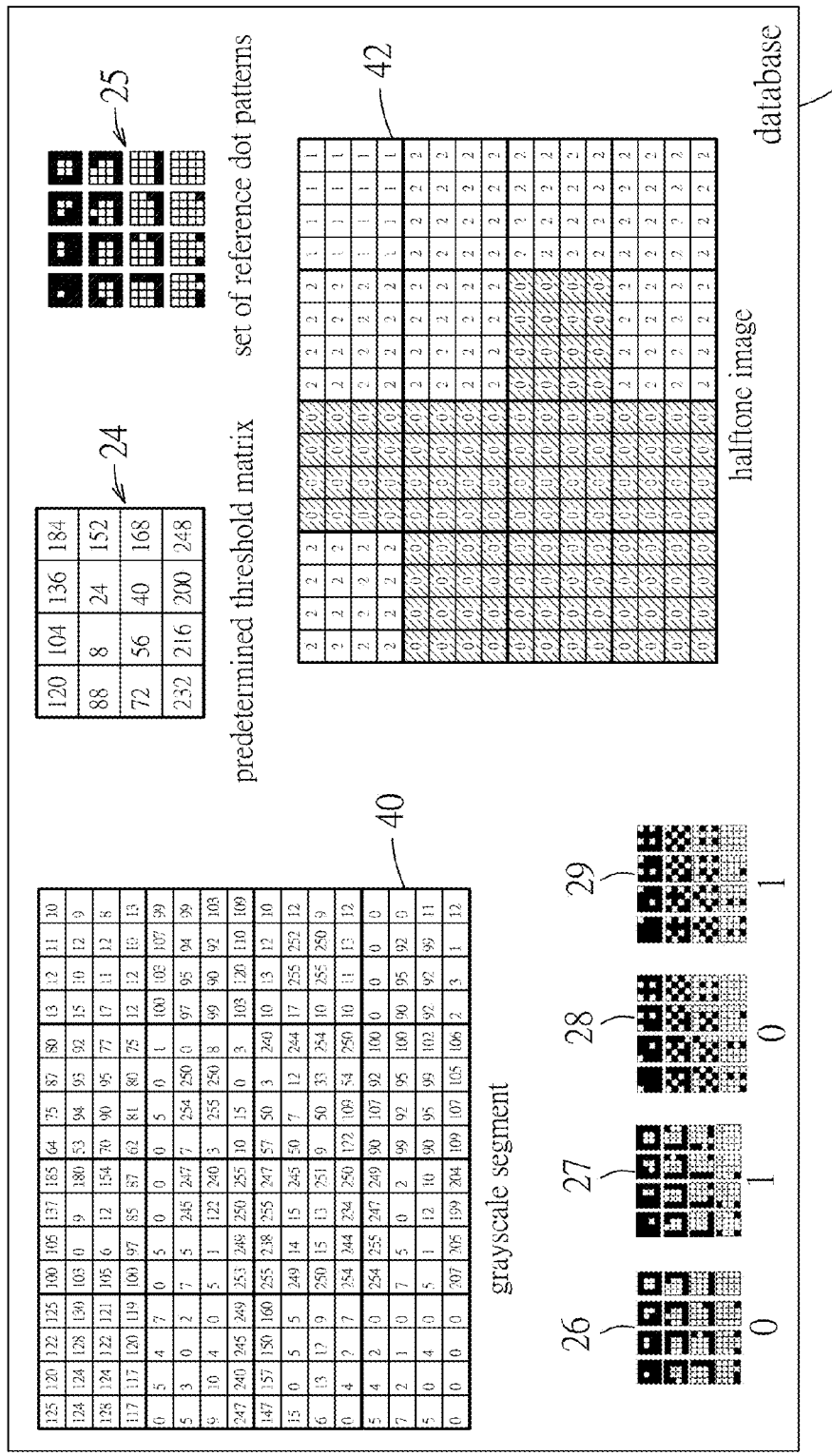
FIG. 19 illustrates a database of the decoding system according to the second embodiment.

Referring further to FIG. 19, in a particular example, the database 61 further stores the carrier cell map 42 that indicates locations of the carrier cells 412 in the data-bearing halftone image 43. As a result, the selecting module 62 is not required to locate the encoded cells, and the decoding module 63 is able to perform the decoding process according to the carrier cell map 42 stored in the database 61.

In the decoding process, when a high-frequency encoded cell that is generated by encoding the high-frequency carrier cell 414 is encountered, the decoding module 63 identifies one of the sets which is generated using the dispersed-dot ordered dithering (i.e., sets 28 and 29) and which includes one of the encoding dot patterns that is identical to the dot pattern of the high-frequency encoded cell. Afterward, the decoding module 63 determines the symbol represented by the high-frequency encoded cell as one bit of the binary code associated with the identified one of the sets of the encoding dot patterns 28 and 29.

On the other hand, when a low-frequency encoded cell that is generated by encoding the low-frequency carrier cell 413 is encountered, the decoding module 63 identifies one of the sets which is generated using the clustered-dot ordered dithering (i.e., sets 26 and 27 and which includes one of the encoding dot patterns that is identical to the dot pattern of the low-frequency encoded cell. Afterward, the decoding module 63 determines the symbol represented by the low-frequency encoded cell as one bit of the binary code associated with the identified one of the sets of the encoding dot patterns 28 and 29.

For example, the cell 43*a* is found to be a high-frequency encoded cell. Looking up the sets 28 and 29 finds that one of the dot patterns included in the set 28 is identical to the dot pattern of the cell 43*a*. Therefore, the first bit of the embedded binary string is determined to be '0', which is associated with the set 28.

Then, the cell 43*b* is found to correspond to a non-carrier cell 410 of the halftone image 42 and is ignored for the decoding process. The next cell 43*c* is found to be a high-frequency encoded cell. Looking up the sets 28 and 29 finds that one of the dot patterns included in the set 29 is identical to the dot pattern of the cell 43*c*. Therefore, the second bit of the embedded bit string is determined to be '1', which is associated with the set 29.

The next cell 43*d* is found to be a low-frequency encoded cell. Looking up the sets 26 and 27 finds that one of the dot patterns included in the set 26 is identical to the dot pattern of the cell 43*d*. Therefore, the third bit of the embedded bit string is determined to be '0', which is associated with the set 26.

The decoding process is then repeated for every one of the encoded cells of the data-bearing halftone image 43 for obtaining the binary string.

To sum up, the encoding system as described herein enables more data to be embedded, and the encoding system as described herein finds merit in occasions where the generated data-bearing halftone image needs to be outputted using a printing device. Embodiments of the disclosure employ encoding processes that generates a data-bearing halftone image in the way of halftoning from a grayscale image without compromising the quality of the data-bearing halftone image, and are applicable is various occasions.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for generating a data-bearing halftone image from a grayscale image, said method comprising the steps of:
    converting a grayscale image into a halftone image by screening the grayscale image using a predetermined clustered-dot threshold matrix that includes a plurality of grayscale threshold values, the halftone image having a plurality of image cells each corresponding to the predetermined clustered-dot threshold matrix in size;
    selecting, from the halftone image, at least one of the image cells to be a carrier cell according to a set of reference dot patterns that corresponds with the predetermined clustered-dot threshold matrix, the carrier cell having a dot pattern identical to one of the reference dot patterns; and
    generating a data-bearing halftone image according to a plurality of sets of encoding dot patterns, each of the sets being associated with a code;
    wherein, in the step of generating a data-bearing halftone image, the dot pattern of the carrier cell is replaced by a specified one of the encoding dot patterns of one of the sets of the encoding dot patterns, and the data-bearing halftone image thus generated is encoded with a code associated with said one of the sets of the encoding dot patterns;
    wherein each of the dot pattern of the carrier cell, the reference dot patterns and the encoding dot patterns consists of a plurality of dots, at least one of which is a first-tone dot and each of the rest of which is a second-tone dot;
    wherein the specified one of the encoding dot patterns and the dot pattern of the carrier cell have the same number of the first-tone dot(s).

2. The method of claim 1, further comprising the steps of:
    categorizing each of the image cells in the halftone image as one of a non-carrier cell, which has the dot pattern not identical to any one of the reference dot patterns, and a carrier cell, which has the dot pattern identical to any one of the reference dot patterns; and
    categorizing each carrier cell to be a low-frequency carrier cell if adjacent image cells of the carrier cell are all carrier cells, and to be a high-frequency carrier cell if otherwise;
    wherein, in the step of generating a data-bearing halftone image, the data-bearing halftone image is encoded with a binary code according to four sets of the encoding dot patterns, two of the sets of the encoding dot patterns are generated using clustered-dot ordered dithering and indicate respectively two different symbols of a binary numeral system, and another two of the sets of the encoding dot patterns are generated using dispersed-dot ordered dithering and indicate respectively the two different symbols of the binary numeral system;

wherein, in the step of generating a data-bearing halftone image, the dot pattern of the low-frequency carrier cell in the halftone image is replaced by one of the encoding dot patterns that has a number of the first-tone dot(s) same as a number of the first-tone dot(s) in the dot pattern of the low-frequency carrier cell, and that is included in one of the sets which is generated using the clustered-dot ordered dithering and which indicates one of the symbols for composing the binary code;

wherein, in the step of generating a data-bearing halftone image, the dot pattern of the high-frequency carrier cell in the halftone image is replaced by one of the encoding dot patterns that has a number of the first-tone dot(s) same as a number of the first-tone dot(s) in the dot pattern of the high-frequency carrier cell, and that is included in one of the sets which is generated using the dispersed-dot ordered dithering and which indicates one of the symbols for composing the binary code.

3. A method for decoding a data-bearing halftone image that is encoded with a code and that includes a plurality of image cells, said method comprising the steps of:

converting a grayscale image that corresponds to the data-bearing halftone image into a halftone image by screening the grayscale image using a predetermined clustered-dot threshold matrix that includes a plurality of grayscale threshold values, the halftone image having a plurality of image cells each corresponding to the predetermined clustered-dot threshold matrix in size;

selecting, from the halftone image, at least one of the image cells to be a carrier cell according to a set of reference dot patterns that corresponds with the predetermined clustered-dot threshold matrix, the carrier cell having a dot pattern identical to one of the reference dot patterns;

determining one of the image cells of the data-bearing halftone image that corresponds in position with the carrier cell as an encoded cell; and decoding the encoded cell of the data-bearing halftone image according to a plurality of sets of encoding dot patterns, each of the sets being associated with a code;

wherein, in the step of decoding the encoded cell, one of the sets of the encoding dot patterns that includes an encoding dot pattern identical to the dot pattern of the encoded cell is identified, and the code represented by the encoded cell is determined as the code associated with the identified one of the sets of the encoding dot patterns.

4. The method of claim 3, further comprising the steps of:

categorizing each of the image cells in the halftone image as one of a non-carrier cell, which has the dot pattern not conforming to any one of the reference dot patterns, and a carrier cell, which has the dot pattern conforming to any one of the reference dot patterns;

categorizing each carrier cell as a low-frequency carrier cell if adjacent image cells of which are all carrier cells, and as a high-frequency carrier cell if otherwise, and determines a part of the data-bearing halftone image that corresponds in position with the low-frequency carrier cell as a low-frequency encoded cell, and a part of the data-bearing halftone image that corresponds in position with the high-frequency carrier cell as a high-frequency encoded cell;

wherein the data-bearing halftone image is decoded with a binary code according to four sets of the encoding dot patterns, two of the sets of the encoding dot patterns are generated using clustered-dot ordered dithering and indicate respectively two different symbols of a binary numeral system, and another two of the sets of the encoding dot patterns are generated using dispersed-dot ordered dithering and indicate respectively the two different symbols of the binary numeral system;

wherein the step of decoding the encoded cell includes the sub-steps of for the low-frequency encoded cell in the data-bearing halftone image, identifying one of the sets which is generated using the clustered-dot ordered dithering and which includes one of the encoding dot patterns that is identical to the dot pattern of the low-frequency encoded cell, and determining the binary code represented by the low-frequency encoded cell as the binary code associated with the identified one of the sets of the encoding dot patterns, and for the high-frequency encoded cell in the data-bearing halftone image, identifying one of the sets which is generated using the dispersed-dot ordered dithering and which includes one of the encoding dot patterns that is identical to the dot pattern of the high-frequency encoded cell, and determining the binary code represented by the high-frequency encoded cell as the binary code associated with the identified one of the sets of the encoding dot patterns.

* * * * *